(12) United States Patent
Cabral

(10) Patent No.: US 8,700,327 B2
(45) Date of Patent: Apr. 15, 2014

(54) METHOD OF DETERMINING ROUTES FOR USE IN NAVIGATION

(75) Inventor: Cesar Cabral, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 492 days.

(21) Appl. No.: 12/768,284

(22) Filed: Apr. 27, 2010

(65) Prior Publication Data

US 2011/0264366 A1 Oct. 27, 2011

(51) Int. Cl.
*G01C 21/34* (2006.01)
*G08G 1/123* (2006.01)

(52) U.S. Cl.
USPC .......................... 701/533; 701/416; 701/411

(58) Field of Classification Search
USPC ......... 701/200, 204, 400, 414, 201, 410, 411, 701/416, 533
See application file for complete search history.

(56) References Cited

U.S. PATENT DOCUMENTS

| | | | |
|---|---|---|---|
| 5,774,073 A * | 6/1998 | Maekawa et al. | 340/995.21 |
| 5,842,146 A | 11/1998 | Shishido | |
| 5,938,720 A * | 8/1999 | Tamai | 701/533 |
| 6,101,443 A | 8/2000 | Kato et al. | |
| 6,317,685 B1 * | 11/2001 | Kozak et al. | 701/414 |
| 6,622,087 B2 | 9/2003 | Anderson | |
| 6,687,615 B1 | 2/2004 | Krull et al. | |
| 6,792,363 B1 | 9/2004 | Bye | |
| 6,999,873 B1 | 2/2006 | Krull et al. | |
| 7,120,539 B2 | 10/2006 | Krull et al. | |
| 7,174,153 B2 | 2/2007 | Ehlers | |
| 7,174,154 B2 | 2/2007 | Ehlers | |
| 7,176,813 B2 | 2/2007 | Kawamata et al. | |
| 7,184,886 B1 | 2/2007 | Krull et al. | |
| 7,203,598 B1 | 4/2007 | Whitsell | |
| 7,236,881 B2 | 6/2007 | Liu et al. | |
| 7,289,039 B2 | 10/2007 | Kato et al. | |
| 7,289,904 B2 | 10/2007 | Uyeki | |
| 7,319,931 B2 | 1/2008 | Uyeki et al. | |
| 7,366,606 B2 | 4/2008 | Uyeki | |
| 7,439,878 B2 | 10/2008 | Kato et al. | |
| 7,451,042 B2 | 11/2008 | Uyeki et al. | |
| 7,502,686 B1 * | 3/2009 | Pemble et al. | 701/438 |
| 7,532,980 B2 | 5/2009 | Suzuki | |
| 7,536,259 B2 | 5/2009 | Kwok et al. | |
| 7,590,490 B2 | 9/2009 | Clark | |
| 2002/0128773 A1 * | 9/2002 | Chowanic et al. | 701/210 |
| 2005/0222751 A1 * | 10/2005 | Uyeki | 701/117 |
| 2005/0256639 A1 | 11/2005 | Aleksic et al. | |
| 2005/0261827 A1 | 11/2005 | Furukawa | |
| 2007/0129055 A1 | 6/2007 | Ehlers | |
| 2007/0129880 A1 | 6/2007 | Thacher | |
| 2007/0138347 A1 | 6/2007 | Ehlers | |
| 2007/0225902 A1 | 9/2007 | Gretton et al. | |
| 2008/0033636 A1 | 2/2008 | Ryu et al. | |
| 2008/0234927 A1 * | 9/2008 | O'Neill | 701/204 |

(Continued)

FOREIGN PATENT DOCUMENTS

JP 2007139573 6/2007

*Primary Examiner* — Fadey Jabr
*Assistant Examiner* — Paula L Schneider
(74) *Attorney, Agent, or Firm* — Plumsea Law Group, LLC

(57) ABSTRACT

A method of determining routes for use in navigation is disclosed. The method includes steps of calculating a current route, calculating an alternative route and comparing the difference in times along each route with a minimum time difference. The minimum time difference is calculated using a dynamic threshold value that varies according to the difference in distances along the current route and the alternative route.

20 Claims, 13 Drawing Sheets

(56) References Cited

U.S. PATENT DOCUMENTS

| | | |
|---|---|---|
| 2008/0262710 A1 | 10/2008 | Li |
| 2008/0262716 A1 | 10/2008 | Li |
| 2009/0048767 A1 | 2/2009 | Vaughn |
| 2009/0105934 A1 | 4/2009 | Tajima et al. |
| 2009/0105940 A1 | 4/2009 | Bitan |
| 2009/0125229 A1 | 5/2009 | Peri et al. |

\* cited by examiner

METHOD OF DETERMINING ROUTES FOR USE IN NAVIGATION

BACKGROUND

The present invention relates generally to a motor vehicle, and in particular to a method of determining routes for a navigation system.

Navigation systems in motor vehicles typically calculate an initial route of travel between a starting location and a destination. As the motor vehicle starts traveling towards the destination along the initial route, the navigation system may check for faster routes at a specified frequency. The navigation system may then either select the faster route or reject the faster route.

The related art lacks provisions for determining if the benefits of selecting the faster route outweigh the risks that the faster route may actually take more time to travel because of errors in estimating the travel time along each route.

SUMMARY

In one aspect, the invention provides a method of providing navigation information for a motor vehicle, comprising the steps of: retrieving a current route that is being used to navigate the motor vehicle to a destination; receiving a current location for the motor vehicle; calculating an alternative route from the current location to the destination, wherein a first travel time between the current location and the destination along the alternative route is estimated to be less than a second travel time between the current location and the destination along the current route; determining a first distance corresponding to the alternative route and a second distance corresponding to the distance left to travel on the current route; and using the first distance, the second distance, the first travel time and the second travel time to determine if the alternative route should be displayed for the user.

In another aspect, the invention provides a method of providing navigation information for a motor vehicle, comprising the steps of: retrieving a current route that is being used to navigate the motor vehicle to a destination; receiving a current location for the motor vehicle; calculating an alternative route from the current location to the destination, wherein a first travel time between the current location and the destination along the alternative route is estimated to be less than a second travel time between the current location and the destination along the current route; determining a first distance corresponding to the alternative route and a second distance corresponding to the distance left to travel on the current route; calculating a minimum time difference; submitting the alternative route to be displayed for a user when the value of the second travel time minus the first travel time is greater than the minimum time difference; preventing the alternative route from being displayed for the user when the value of the second travel time minus the first travel time is less than or equal to the minimum time difference; and where the minimum time difference varies as the difference between the first distance and the second distance varies.

In another aspect, the invention provides A method of providing navigation information for a motor vehicle, comprising the steps of: retrieving a current route that is being used to navigate the motor vehicle to a destination; receiving a current location for the motor vehicle; calculating an alternative route from the current location to the destination, wherein a first travel time between the current location and the destination along the alternative route is estimated to be less than a second travel time between the current location and the destination along the current route; determining a first distance corresponding to the alternative route and a second distance corresponding to the distance left to travel on the current route; calculating a dynamic threshold value, the dynamic threshold value being variable; setting a minimum time difference equal to the dynamic threshold value multiplied by the second travel time; and comparing the value of the second travel time minus the first travel time with the minimum time difference to determine if the alternative route should be displayed for a user.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
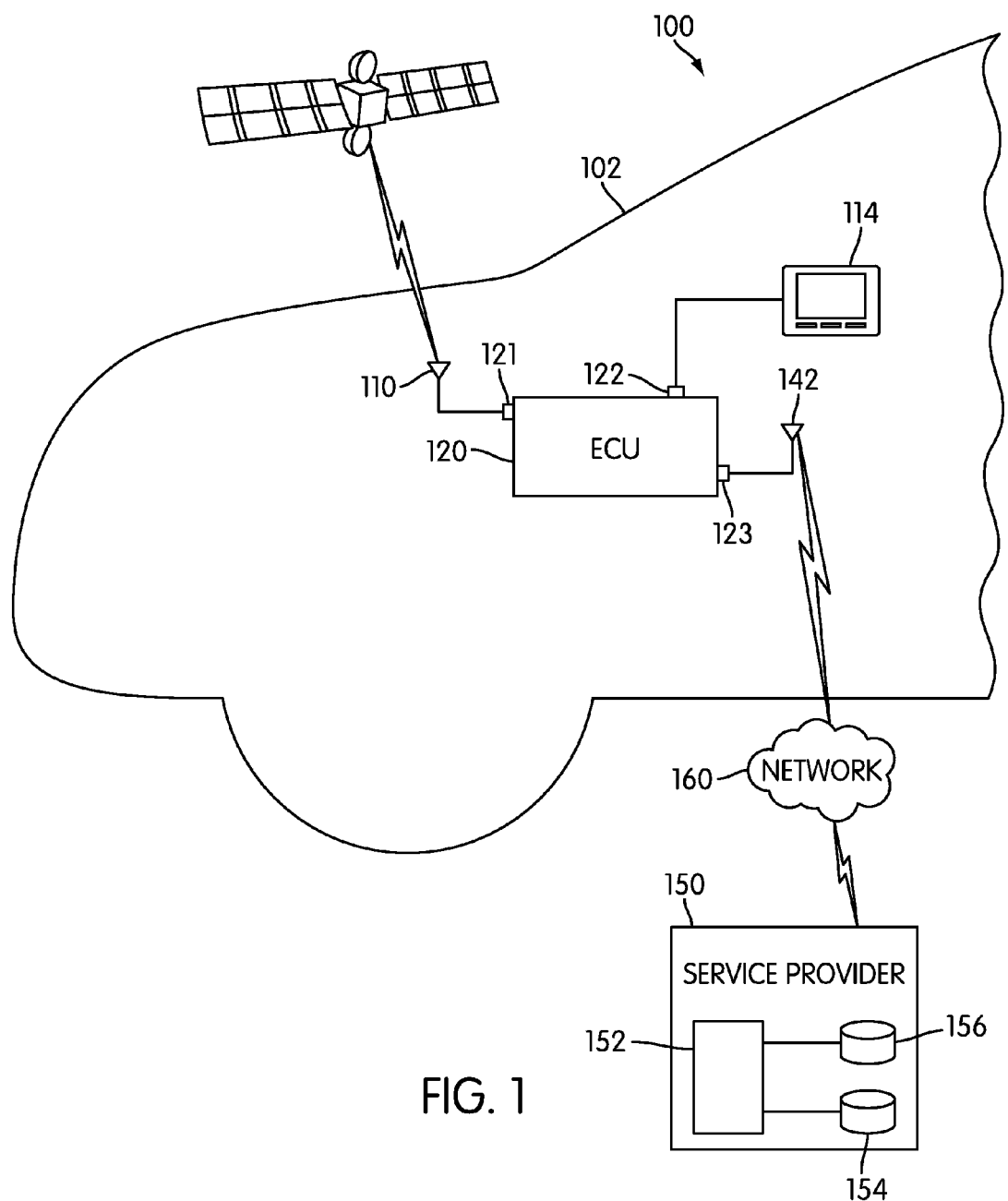
FIG. 1 is a schematic view of an embodiment of a navigation system associated with a motor vehicle.

FIG. 1 is a schematic view of an embodiment of navigation system 100 that is configured to be used with motor vehicle 102. For purposes of clarity, only some components of a motor vehicle that may be relevant to navigation system 100 are illustrated. Furthermore, in other embodiments, additional components can be added or removed.

Navigation system 100 can be any system capable of providing navigation information to a user. The term "navigation information" refers to any information that can be used to assist in determining a location or providing directions to a location. Some examples of navigation information include street addresses, street names, street or address numbers, apartment or suite numbers, intersection information, points of interest, parks, any political or geographical subdivision including town, township, province, prefecture, city, state, district, ZIP or postal code, and country. Navigation information can also include commercial information including business and restaurant names, commercial districts, shopping centers, and parking facilities. Navigation information can also include geographical information, including information obtained from any Global Navigational Satellite System (GNSS), including Global Positioning System or Satellite (GPS), Glonass (Russian) and/or Galileo (European). The term "GPS" is used to denote any global navigational satellite system. Navigation information can include one item of information, as well as a combination of several items of information.

Generally, any navigation system known in the art can be used. One example of a navigation system is disclosed in U.S. Patent Application Publication Number 2005/0261827, to Furukawa, and filed on May 19, 2004, the entirety of which is hereby incorporated by reference. Another example of a navigation system is disclosed in U.S. Pat. No. 5,842,146, to Shishido, and filed on May 10, 1996, the entirety of which is hereby incorporated by reference.

Navigation system 100 can include provisions for receiving GPS information. In some cases, navigation system 100 can include GPS receiver 110. For purposes of clarity, GPS receiver 110 is illustrated in the form of a GPS antenna in the current embodiment. However, it will be understood that GPS receiver 110 can be associated with both an antenna and a separate receiving device in some embodiments. In an exemplary embodiment, GPS receiver 110 can be used for gathering a current location for motor vehicle 102. With this arrangement, navigation system 100 may be configured to automatically determine a beginning point for a particular route as well as for tracking the position of motor vehicle 102 along the route.

Navigation system 100 can include provisions for communicating with a driver. In some embodiments, navigation system 100 can include interface 114. In some cases, interface 114 can include provisions for transmitting information to a driver and/or passenger. For example, interface 114 can include a display screen that displays maps including vehicle location and route information. In other cases, interface 114 can include provisions for receiving information from a driver and/or passenger. For example, interface 114 can include buttons that allow a driver to input destinations for determining routes. In some cases, the buttons may be push-type buttons disposed adjacent to a display screen. In other cases, the display screen can be a touch-screen display capable of receiving user input. In an exemplary embodiment, interface 114 can include provisions for transmitting and receiving information from a driver and/or passenger.

Motor vehicle 102 may include provisions for communicating with, and in some cases controlling, the various components associated with navigation system 100. In some embodiments, navigation system 100 may be associated with a computer or similar device. In the current embodiment, navigation system 100 may include electronic control unit 120, hereby referred to as ECU 120. In one embodiment, ECU 120 may be configured to communicate with, and/or control, various components of navigation system 100. In addition, in some embodiments, ECU 120 may be configured to control additional components of a motor vehicle that are not shown.

ECU 120 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 120 are optional. Some embodiments may include a given port or provision, while others may exclude it. The following description discloses many of the possible ports and provisions that can be used, however, it should be kept in mind that not every port or provision must be used or included in a given embodiment.

In some embodiments, ECU 120 can include first port 121 for communicating with GPS receiver 110. In particular, ECU 120 may be configured to receive GPS information from GPS receiver 110. Also, ECU 120 can include second port 122 for communicating with interface 114. In particular, ECU 120 can be configured to transmit information to interface 114, as well as to receive information from interface 114.

In some embodiments, a navigation system can be associated with service provider 150. The term "service provider" as used throughout this detailed description and in the claims refers to any collection of computing resources and/or databases that are disposed outside of motor vehicle 102 and which are capable of providing resources to motor vehicle 102. In some cases, service provider 150 may be a collection of networked computers or computer servers. Service provider 150 may be used to receive, process and/or store information of any kind. In one embodiment, service provider 150 may be configured to collect information related to traffic on roadways, process the information and store the information for later use. In addition, service provider 150 may be configured to calculate routes for navigation system 100.

Service provider 150 may include computer system 152. The term "computer system" refers to the computing resources of a single computer, a portion of the computing resources of a single computer, and/or two or more computers in communication with one another, also any of these resources can be operated by one or more human users. In one embodiment, computer system 152 includes a server.

A service provider can include various provisions for storing information. In embodiments where a service provider may be used to calculate routes for a navigation system, the service provider can include one or more databases for storing information. In some embodiments, a service provider can include one or more databases for navigation information. In addition, in some embodiments, a service provider can include one or more databases for storing traffic information. In other embodiments, where routes may be calculated onboard of a motor vehicle by an electronic control unit or another system, the motor vehicle can include one or more databases that store traffic information. It will be understood that various different databases could also provide other types of information including, but not limited to: weather information, carpool lane information, energy consumption information as well as any other kind of information.

In this embodiment, service provider 150 may be provided with map database 154, which stores navigation information. Service provider 150 may also be provided with traffic database 156. Traffic database 156 may be any kind of database configured to store traffic information. The term "traffic information" as used throughout this detailed description and in the claims refers to any information related to the speed of one or more vehicles on a roadway. Traffic information can include the current speeds of one or more vehicles. In some cases, the average speed of vehicles on a roadway may be stored as traffic information. Traffic information may refer to either real-time traffic information or historic traffic information.

Map database 154 and traffic database 156 can communicate with computer system 152. Map database 154 and traffic database 156 can include any kind of storage device, including but not limited to: magnetic, optical, magneto-optical, and/or memory, including volatile memory and non-volatile memory. In some embodiments, map database 154 and traffic database 156 may be integral with computer system 152. In other embodiments, map database 154 and traffic database 156 may be separate from computer system 152.

A navigation system can include provisions for communicating with a service provider. In one embodiment, navigation system 100 may communicate with service provider 150 using network 160. Generally, network 160 may be any type of network. In some cases, network 160 may be a vehicle communication network that uses motor vehicles for at least some nodes of the network. In addition, a vehicle communication network may include roadside units as nodes. Vehicle communication networks may be used for exchanging various types of information between motor vehicles and/or roadside units. An example of such a vehicular network is a dedicated short range communication (DSRC) network. In some cases, DSRC networks may be configured to operate in the 5.9 GHz band with bandwidth of approximately 75 MHz. Furthermore, DSRC networks may have a range of approximately 1000 m. In other embodiments, navigation system 100 can be configured to communicate with service provider 150 using any other type of wireless network, including, but not limited to: WiFi networks, cell phone networks, as well as any other type of network. Furthermore, network 160 may be associated with any type of network standard including, but not limited to: CDMA, TDMA, GSM, AMPS, PCS, analog and/or W-CDMA.

In some embodiments, ECU 120 may include third port 123 that is configured to communicate with a network antenna. In an exemplary embodiment, third port 123 may be associated with network antenna 142 that is configured to exchange information with service provider 150 using network 160.

Navigation system 100 can include provisions for communicating with one or more components of a motor vehicle that are not associated directly with navigation system 100. In some cases, ECU 120 may include additional ports for communicating directly with one or more additional devices of a motor vehicle, including various sensors or systems of the motor vehicle.

In some embodiments, all or most of the items shown in FIG. 1 are housed in a single case or unit. In other embodiments, the various items shown in FIG. 1 are not housed in a single physical case, but instead, are distributed throughout motor vehicle 100 (see FIG. 1) and communicate with one another via known wired or wireless methods. For example, in a system where one or more items communicate wirelessly, the Bluetooth® protocol can be used.

Figure 2:
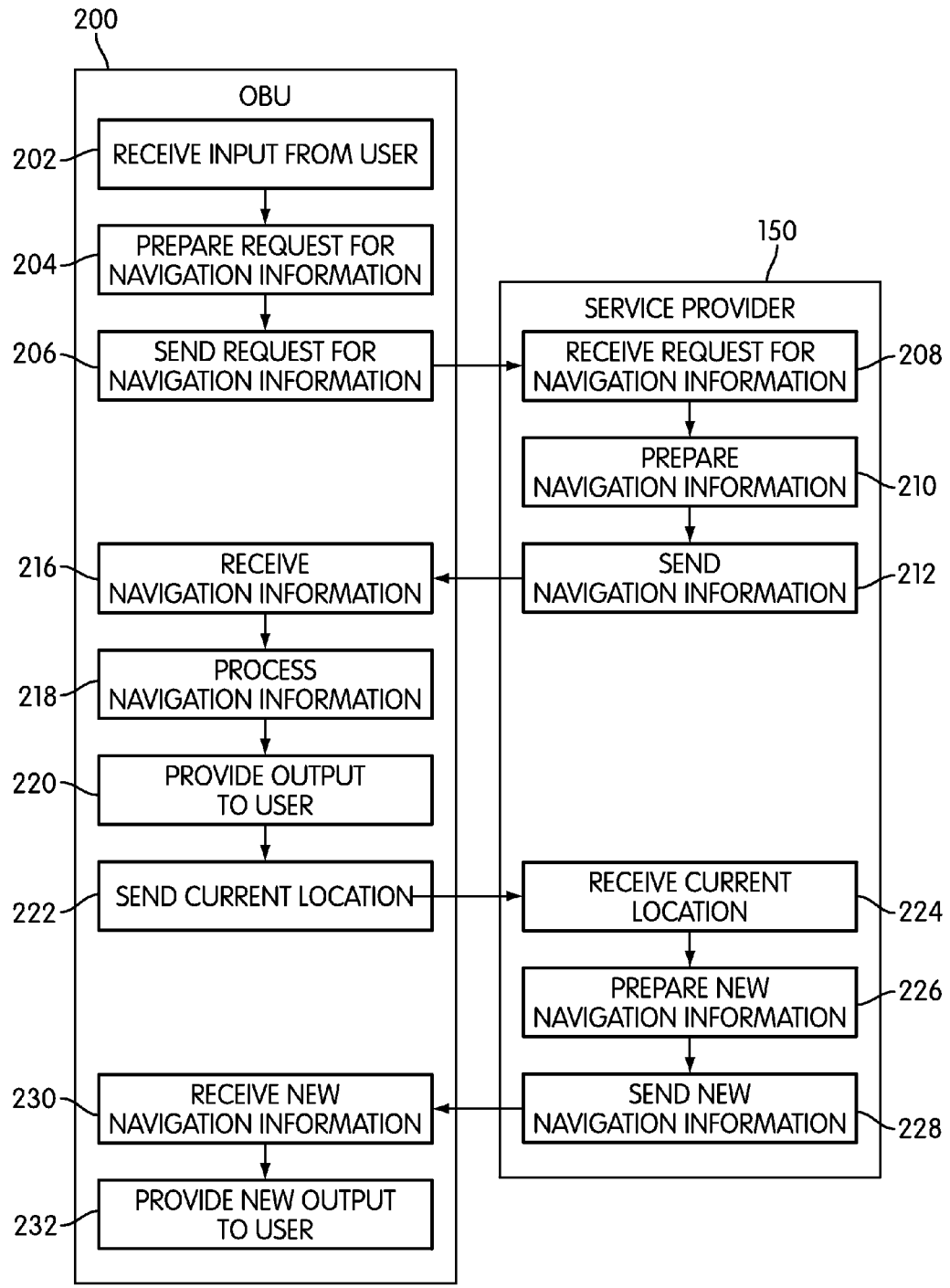
FIG. 2 is an embodiment of a process for operating a navigation system.

Some embodiments provide a system and method of managing navigation information. FIG. 2 illustrates a process of an embodiment of a system and method for operating navigation information.

In the embodiment shown in FIG. 2, certain steps are associated with On-Board Unit (referred to as "OBU") 200 and certain steps are associated with service provider 150. In some cases, those steps associated with OBU 200 are performed on or by OBU 200 and those steps associated with service provider 150 are performed on or by service provider 150. However, this is not necessarily the case, and those steps associated with OBU 200 can be performed on or by service provider 150 or some other resource, and those steps associated with service provider 150 can be performed on or by OBU 200 or some other resource.

OBU 200 is a device or provision associated with motor vehicle 102. In some embodiments, OBU 200 includes provisions that permit OBU 200 to receive information. In some embodiments, OBU 200 can store information in a memory or computer readable media. In some embodiments, OBU 200 includes provisions that permit OBU 200 to process information. In some embodiments, OBU 200 includes provisions that permit OBU 200 to display information. In some embodiments, OBU 200 includes provisions that permit OBU 200 to receive information from a user. In some embodiments, OBU 200 includes provisions that permit OBU 200 to receive information from a wireless network. In some embodiments, OBU 200 includes provisions that permit OBU 200 to interact with a user. In some embodiments, OBU 200 includes a combination of two or more of the above provisions.

Different embodiments can include different elements or features. For simplicity, the term, "On-Board Unit" (OBU) is used to refer to those elements or components that are associated with motor vehicle 100 (see FIG. 1) for a particular embodiment. In an exemplary embodiment, OBU 200 comprises one or more facilities of ECU 120. OBU can also include one or more of the items shown in FIG. 1, for example, ECU 120, interface 114, and/or GPS receiver 110.

In some embodiments, as shown in FIG. 2, the process begins when an input is received in step 202. Any form of input can be received in step 202. In some cases, the input is in the form of one or more buttons being pressed, and/or interaction with a touch screen associated with interface 114. In some cases, a combination of input from buttons and/or touch screen interaction is received. As an example, in one embodiment a user may input a desired destination using interface 114. In some cases, a user could also input a starting location. In other cases, however, the current location as determined from information received at GPS receiver 110 can be used as the starting location.

It is also possible for voice information to be received in step 202. Any known speech recognition process or program can be utilized to convert spoken words, phrases and/or numbers into a machine readable format. Preferably, the IBM® embedded Via Voice speech recognition engine is used.

In step 204, OBU 200 analyzes and processes the information received in step 202 and prepares a request for navigation information. In step 206, OBU 200 sends a request for navigation information. In step 208, service provider 150 receives a request for navigation information. In step 210, service provider 150 analyzes and processes the request for navigation information and prepares a response to the request. In step 212, service provider 150 sends the requested navigation information to OBU 200.

During step 216, OBU 200 receives the navigation information. Following this, during step 218 and step 220, OBU processes the navigation information and then provides the output to a user. In some cases, for example, the navigation information includes a navigation route between a current location and a destination. The navigation information may be displayed visually on interface 114 for a user.

Following step 220, during step 222, OBU 200 may submit the current location of motor vehicle 102 to service provider 150. Next, during step 224, OBU 200 may receive the current location from OBU 200. Using the updated location for motor vehicle 102, service provider 150 may prepare new navigation information during step 226. Then, during step 228, the new navigation information may be sent to OBU 200. During step 230 and step 232, OBU 200 may receive the new navigation information and provide the new output to a user. The new navigation information could include updated route information including, in some cases, information about an alternative route that may be faster than the current route being used. In some cases, the alternative route may be displayed on interface 114 for the user. The user may then have the option of selecting the alternative route.

It will be understood that in other embodiments, the steps performed by service provider 150 may be accomplished by OBU 200. In particular, in some cases, OBU 200 may be configured to prepare navigation information including routes between various geographic locations. In these embodiments, OBU 200 may also communicate with one or more remote databases that can store traffic information, weather information as well as any other kinds of information that may be used to determine a route for a motor vehicle.

Figure 3:
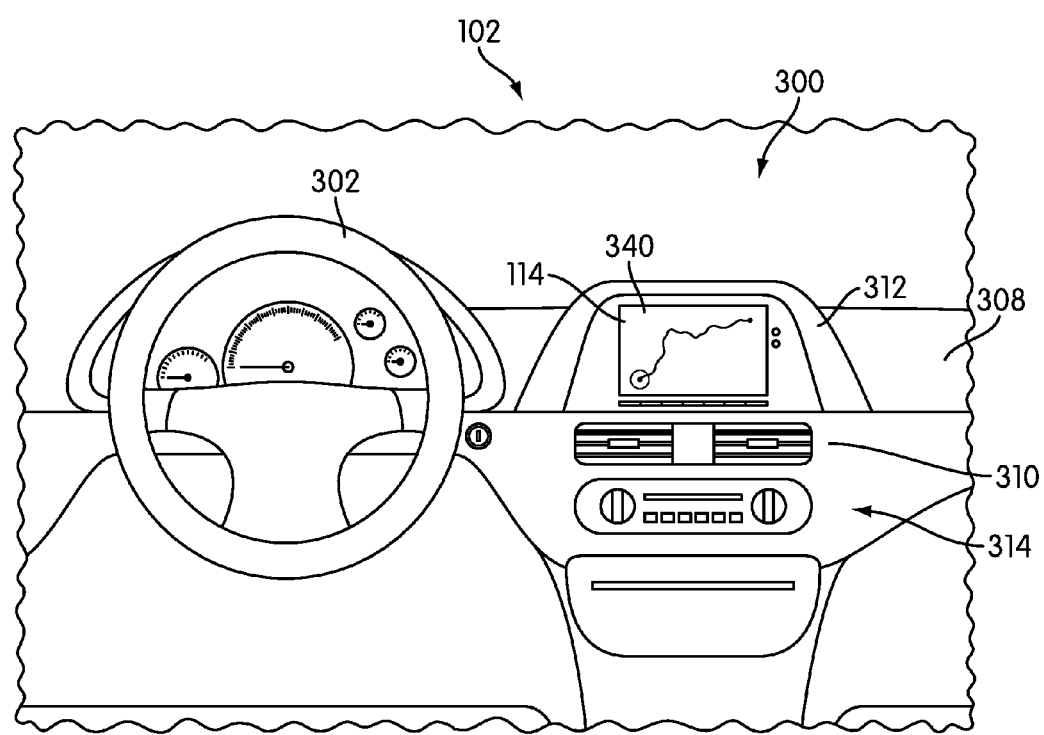
FIG. 3 is view of an embodiment of an interior portion of a passenger cabin of a motor vehicle.

FIG. 3 is an exemplary embodiment of an interior 300 of a passenger cabin in motor vehicle 102 (see FIG. 1). Interior 300 includes steering wheel 302, dashboard 308 and center console 310. Center console 310 includes an upper portion 312 and a lower portion 314. In some embodiments, lower portion 314 includes radio and/or audio controls. In one embodiment, upper portion 312 includes interface 114. In some embodiments, upper portion 312 may include a multi-function unit that can communicate or control an audio system, a climate control system and/or a navigation system. In one embodiment, ECU 120 or portions of ECU 120 are disposed behind interface 114. In some embodiments, interface 114 can include display screen 340. In some cases, interface 114 can also include buttons. Furthermore, in some cases, display screen 340 may be a touch screen.

Figure 4:
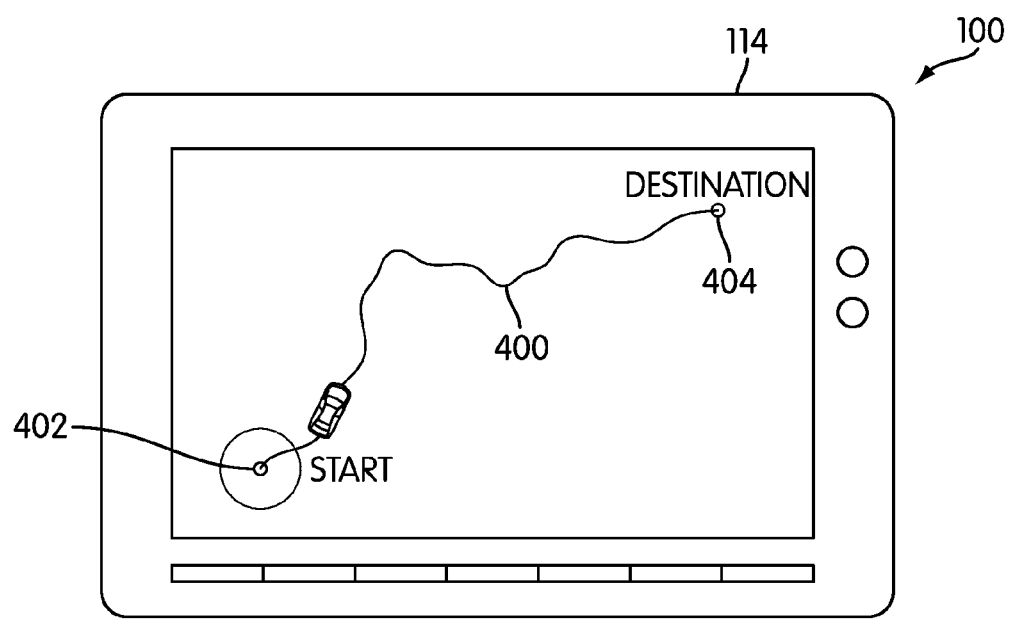
FIG. 4 is a view of an embodiment of an interface for a navigation system.

FIG. 4 illustrates a close up view of an embodiment of interface 114. In this case, navigation system 100 displays route 400 that provides a route between starting location 402 and destination (or ending location) 404. In some cases, route 400 may be determined according to one or more steps discussed in detail above and shown in FIG. 2. Upon receiving a starting location and a destination, navigation system 100 may calculate a fastest route between the two locations. In some cases, navigation system 100 can use additional criteria for determining a route. For example, in some cases, navigation system 100 can determine a fastest route that does or does not include a carpool lane, as disclosed in U.S. patent application Ser. No. 12/465,308, entitled "Navigation System for a Motor Vehicle" and filed on May 13, 2009, the entirety of which is hereby incorporated by reference. In other embodiments, navigation system 100 could determine a route that minimizes energy consumption for a gasoline vehicle, an electric vehicle and/or a hybrid vehicle. Methods for determining routes that minimize energy consumption can be found in U.S. patent application Ser. No. 12/749,838, entitled "Minimum Energy Route For A Motor Vehicle" and filed on Mar. 30, 2010, and U.S. patent application Ser. No. 12/749,856, entitled "Energy Maps And Method of Making " and filed on Mar. 30, 2010, the entirety of both being hereby incorporated by reference. In still other embodiments, navigation system 100 may calculate a route using any other criteria.

In some embodiments, navigation system 100 may continue to search for faster routes as motor vehicle 102 travels on route 400. For example, in some cases, navigation system 100 may search for alternative routes at predefined distance intervals or at predetermined time intervals. In one embodiment, for example, navigation system 100 could search for alternative routes at every five mile interval along the route. In another embodiment, navigation system 100 could search for alternative routes at every five minute interval along the route. It will be understood that these embodiments are only intended to be exemplary and in other cases any other distance or time interval could be used. Moreover, in still other cases, any other criteria can be used to determine when navigation system 100 may search for alternative routes. In still other embodiments, navigation system 100 may continuously search for alternative routes. Upon finding an alternative route that would decrease the total travel time to the destination, navigation system 100 could display the alternative route for the user. In some cases, a user could select the new alternative route or the current route to continue traveling towards the destination.

Figure 5:
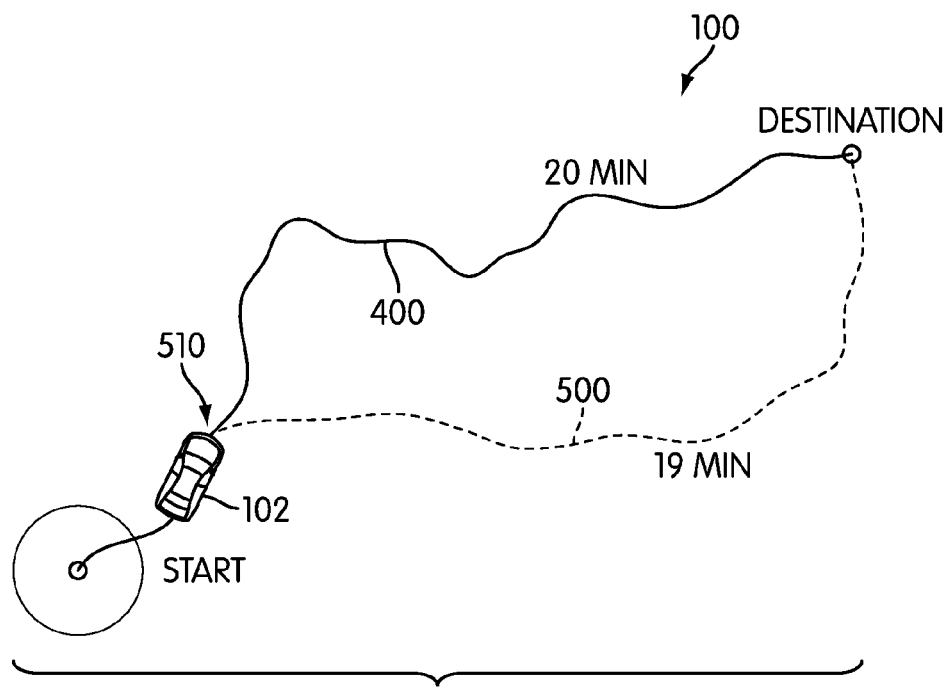
FIG. 5 is a schematic view of an embodiment of a current route and an alternate route being considered by a navigation system.

Referring now to FIG. 5, in the current embodiment, navigation system 100 has found alternative route 500. In this case, alternative route 500 is a distinct route from route 400. Furthermore, alternative route 500 starts at a portion of route 400 corresponding to current location 510 of motor vehicle 102. Both route 400 and alternative route 500 end at destination 404.

Navigation system 100 may estimate the travel time along each route starting at current location 510 and ending at destination 404. In the current embodiment, the travel time along route 400 is estimated to be approximately 20 minutes from current location 510 to destination 404. In contrast, the travel time along alternative route 500 is estimated to be approximately 19 minutes from current location 510 to destination 404.

Although navigation system 100 has determined that alternative route 500 is faster than route 400, the time of travel on each route is only an estimated value. Therefore, it is possible that the actual time of travel on alternative route 500 may be slightly greater than the time of travel on route 400. This could occur, for example, if incorrect traffic information is used to estimate time of travel. In other cases, other factors could also contribute to errors in estimating time of travel on each route.

A navigation system can include provisions for determining when to display an alternative route for a user. In order to reduce the probability of proposing a slower route than the current route, a navigation system may determine if the difference in the travel time of the two routes is large enough to alert a user about the alternative route. In some embodiments, a navigation system may use information about the travel times along each route to determine if the alternative route should be displayed. In an exemplary embodiment, a navigation system may use information about the distances along two routes in addition to travel times along the routes to determine if the alternative route should be displayed.

Figure 6:
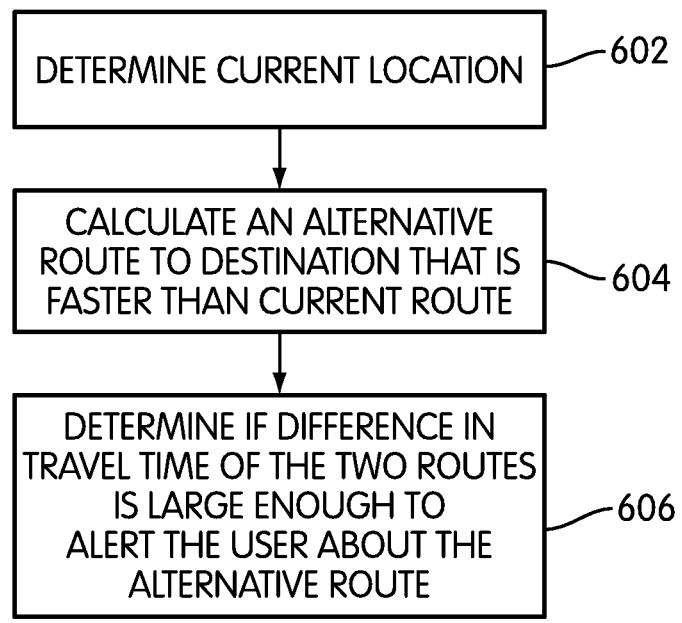
FIG. 6 is an embodiment of a process for operating a navigation system.

FIG. 6 illustrates an embodiment of a process of operating a navigation system. In some embodiments, some of the following steps could be accomplished by OBU 200. In other embodiments, some of the following steps could be accomplished by service provider 150. In addition, in other embodiments, some of the steps could be performed by other components of motor vehicle 102. For purposes of clarity, navigation system 100 may be used to refer collectively to OBU 200 and/or service provider 150. In other words, steps performed by navigation system 100 may be performed by either OBU 200 or service provider 150 in the following embodiments. It will be understood that in other embodiments one or more of the following steps may be optional.

During step 602, navigation system 100 may determine the current location of motor vehicle 102 (see FIG. 1). Next, during step 604, navigation system 100 may calculate an alternative route to the destination that is faster than the current route. During this step, navigation system 100 may make use of various kinds of information to estimate a travel time along both the current route and the alternative route. For example, navigation system 100 may use distance information, traffic information, speed limit information, intersection information, weather information, car pool lane information, as well as any other kind of information that may be used to estimate travel times on a route.

Following step 604, during step 606, navigation system 100 may determine if the difference in travel times between the two routes is large enough to alert the user about the alternative route. In some cases, following steps 606, the alternative route may be displayed for the user. In other cases, however, the alternative route may not be displayed for the user. In some cases, for example, if the difference in travel times between the current route and the alternative route is below some error or tolerance, then the alternative route may not be displayed.

Figure 7:
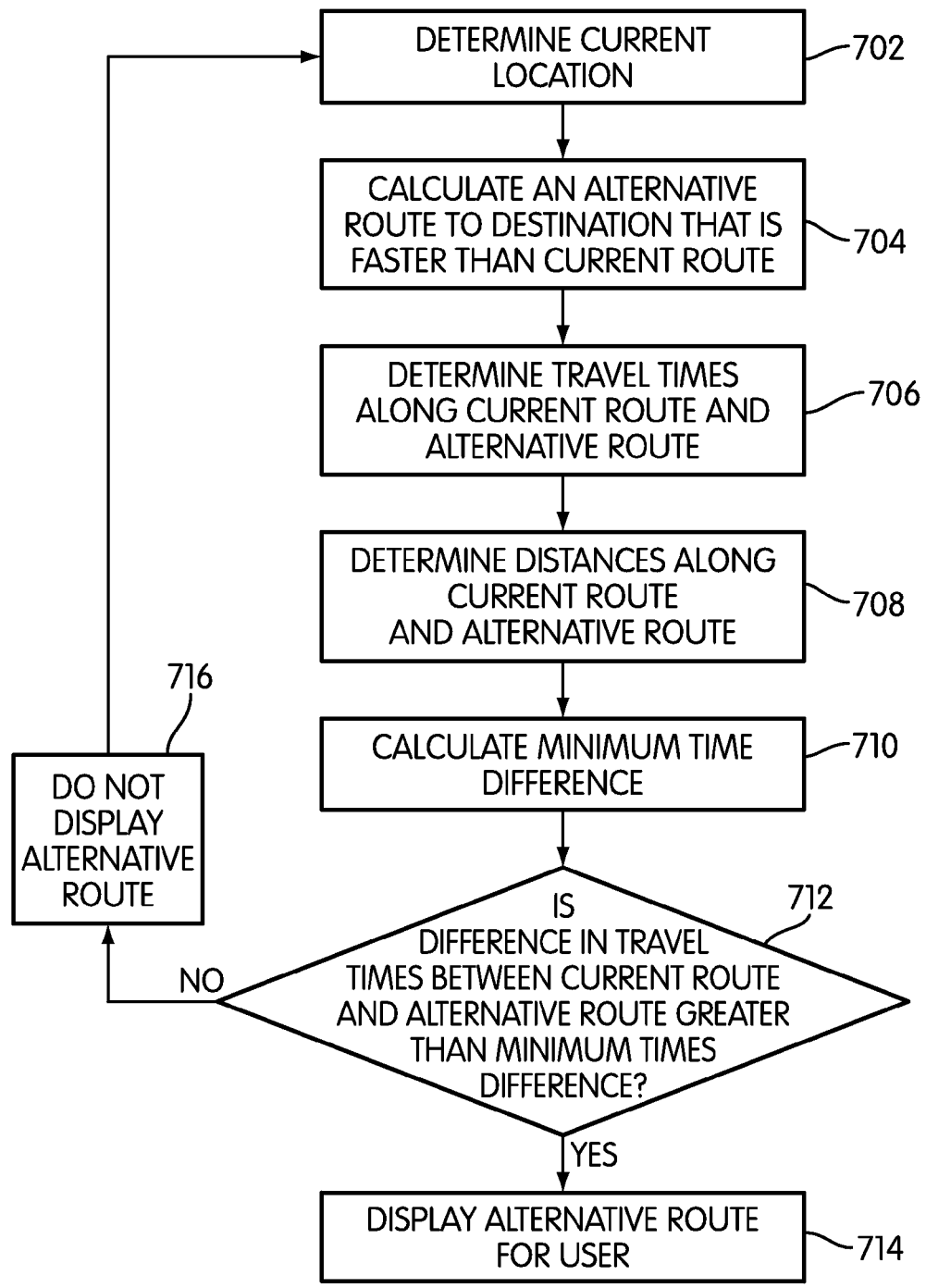
FIG. 7 is an embodiment of a detailed process for operating a navigation system.

FIG. 7 illustrates an embodiment of a detailed process of operating a navigation system. In some embodiments, some of the following steps could be accomplished by OBU 200. In other embodiments, some of the following steps could be accomplished by service provider 150. In addition, in other embodiments, some of the steps could be performed by other components of motor vehicle 102. For purposes of clarity, navigation system 100 may be used to refer collectively to OBU 200 and/or service provider 150. In other words, steps performed by navigation system 100 may performed by either OBU 200 or service provider 150 in the following embodiments. It will be understood that in other embodiments one or more of the following steps may be optional.

During step 702, navigation system 100 may determine the current location of motor vehicle 102 (see FIG. 1). Next, during step 704, navigation system 100 may calculate an alternative route to the destination that is faster than the current route. Following step 704, navigation system 100 may proceed to step 706.

During step 706, navigation system 100 may determine the travel times along the current route and the alternate route. In particular, navigation system 100 may determine a first travel time between the current location and the destination along the alternative route and a second travel time between the current location and the destination along the current route. Following this, during step 708, navigation system 100 may determine the distances along the current route and the alternative route. In particular, navigation system 100 may determine a first distance from the current location to the destination along the alternative route and a second distance from the current location to the destination along the current route.

Next, during step 710, navigation system 100 may calculate a minimum time difference. The minimum time difference may be a criteria used to determine if the alternate route should be displayed for a user. For example, if the time saved by switching to the alternate route is greater than the minimum time difference, the alternate route may be displayed for the user. However, if the time saved by switching to the alternate route is less than or equal to the minimum time difference than the alternate route may not be displayed. In different embodiments, the minimum time difference can be determined in any manner using any calculation or algorithm. An exemplary method of determining the minimum time difference is discussed in further detail below.

During step 712, navigation system 100 may determine if the difference in travel times between the current route and the alternative route is greater than the minimum time difference. In other words, navigation system 100 may determine if the value of the second travel time minus the first travel time is greater than the minimum time difference. If so, navigation system 100 may proceed to step 714. During step 714, navigation system 100 may display the alternative route for the user. In some cases, where some steps are performed by a service provider, step 714 may be preceded by a step of submitting the alternative route to an on board unit. If, however, navigation system 100 determines that the difference in travel times between the current route and the alternative route is less than or equal to the minimum time difference, navigation system 100 may proceed to step 716. During step 716, navigation system 100 does not display the alternate route for the user. Following step 716, navigation system 100 may return to step 702. At this point, the process can be repeated to search for other alternative routes.

Figure 8:
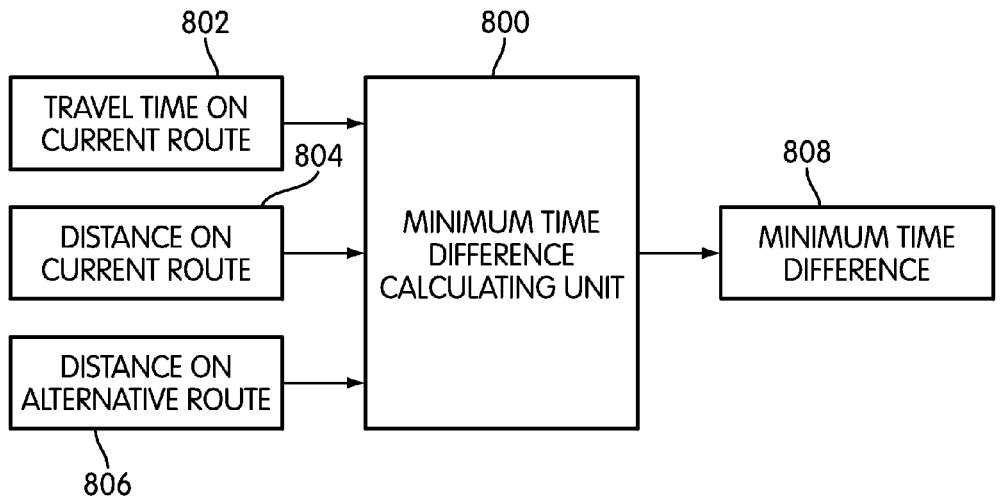
FIG. 8 is a schematic view of an embodiment of a minimum time difference calculating unit.
Figure 9:
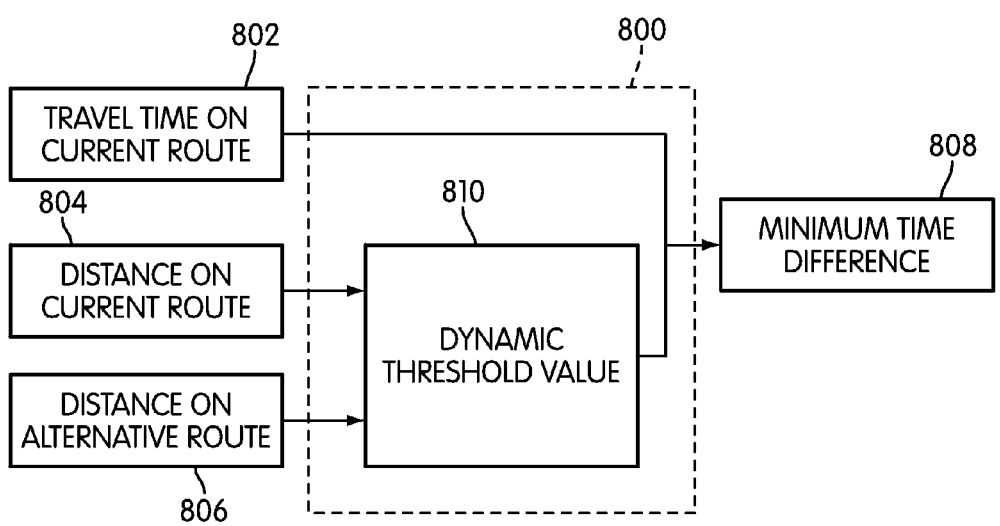
FIG. 9 is a schematic view of an embodiment of a minimum time difference calculating unit.

FIGS. 8 and 9 illustrate an embodiment of minimum time difference calculating unit 800. Minimum time difference calculating unit 800 may be any calculation, algorithm or process that is used to determine minimum time difference 808. Referring to FIG. 8, in the current embodiment, minimum time difference calculating unit 800 is a function of first input 802, second input 804 and third input 806. In this case, first input 802 corresponds to the travel time on the current route. Also, second input 804 and third input 806 correspond to the distance associated with the current route and the distance associated with the alternative route, respectively. In other words, the minimum time difference may be a function of the travel time on the current route as well as the distances along both the current route and the alternative route.

Referring now to FIG. 9, minimum time difference calculating unit 800 may be associated with dynamic threshold value 810. The term "dynamic threshold value" refers to any parameter that may be used to calculate a minimum time difference. In some embodiments, dynamic threshold value 810 may be a dynamic value that changes as a function of one or more inputs. In an exemplary embodiment, dynamic threshold value 810 may be a dynamic value that varies as a function of the distance along the current route and the distance along the alternative route. With this arrangement, dynamic threshold value 810 may be used with the travel time on the current route to calculate minimum time difference 808.

Figure 10:
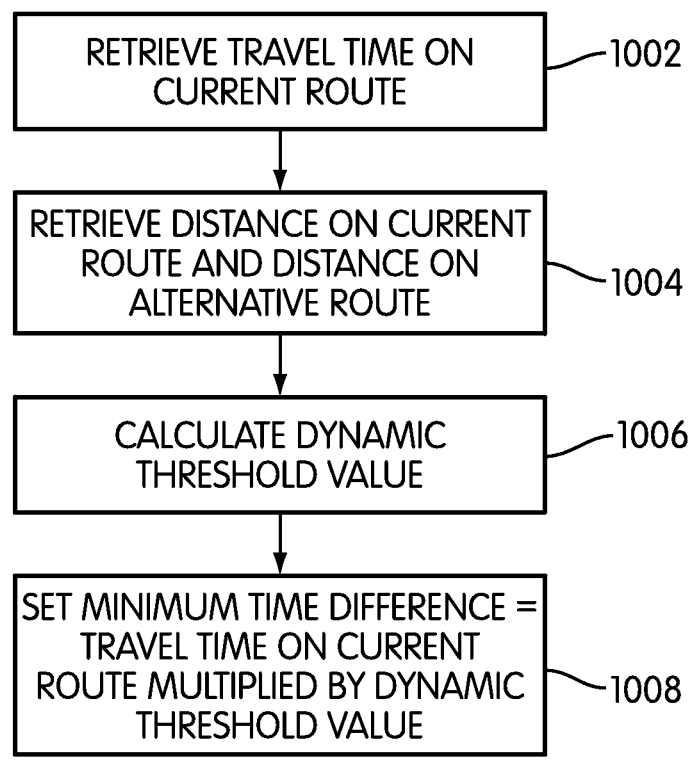
FIG. 10 is an embodiment of a process of calculating a minimum time difference.

FIG. 10 illustrates an embodiment of an exemplary process for calculating a minimum time difference. During step 1002, navigation system 100 may retrieve the travel time along the current route. Next, during step 1004, navigation system 100 may retrieve the distance along the current route and the distance along the alternative route. During step 1006, navigation system 100 may calculate a dynamic threshold value. In some cases, the dynamic threshold value may be calculated as a function of the distance along the current route and the distance along the alternative route. In an exemplary embodiment, the dynamic threshold value may be calculated as a function of the difference between the distance along the current route and the distance along the alternative route. Next, during step 1008, navigation system 100 may set the minimum time difference equal to the travel time on the current route multiplied by the dynamic threshold value. As an example, if the travel time on the current route is 5 minutes and the dynamic threshold value has a value of 0.1, the minimum time difference will have a value of 5 multiplied by 0.1, which equals 0.5 minutes or 30 seconds.

Generally, a dynamic threshold value can have any value. In some cases, the value of the dynamic threshold value may be in the range between 0 and 1. In such cases, multiplying the dynamic threshold value by the travel time on the current route is equivalent to determining a particular percentage of the travel time on the current route. In other words, using the configuration discussed here, the minimum time difference is calculated as a percentage of the travel time on the current route. For example, in a situation where the dynamic threshold value is 0.1, the minimum time difference will be calculated as 10% of the travel time on the current route. In contrast, in a situation where the dynamic threshold value is 0.3, the minimum time difference will be calculated as 30% of the travel time on the current route.

Figure 11:
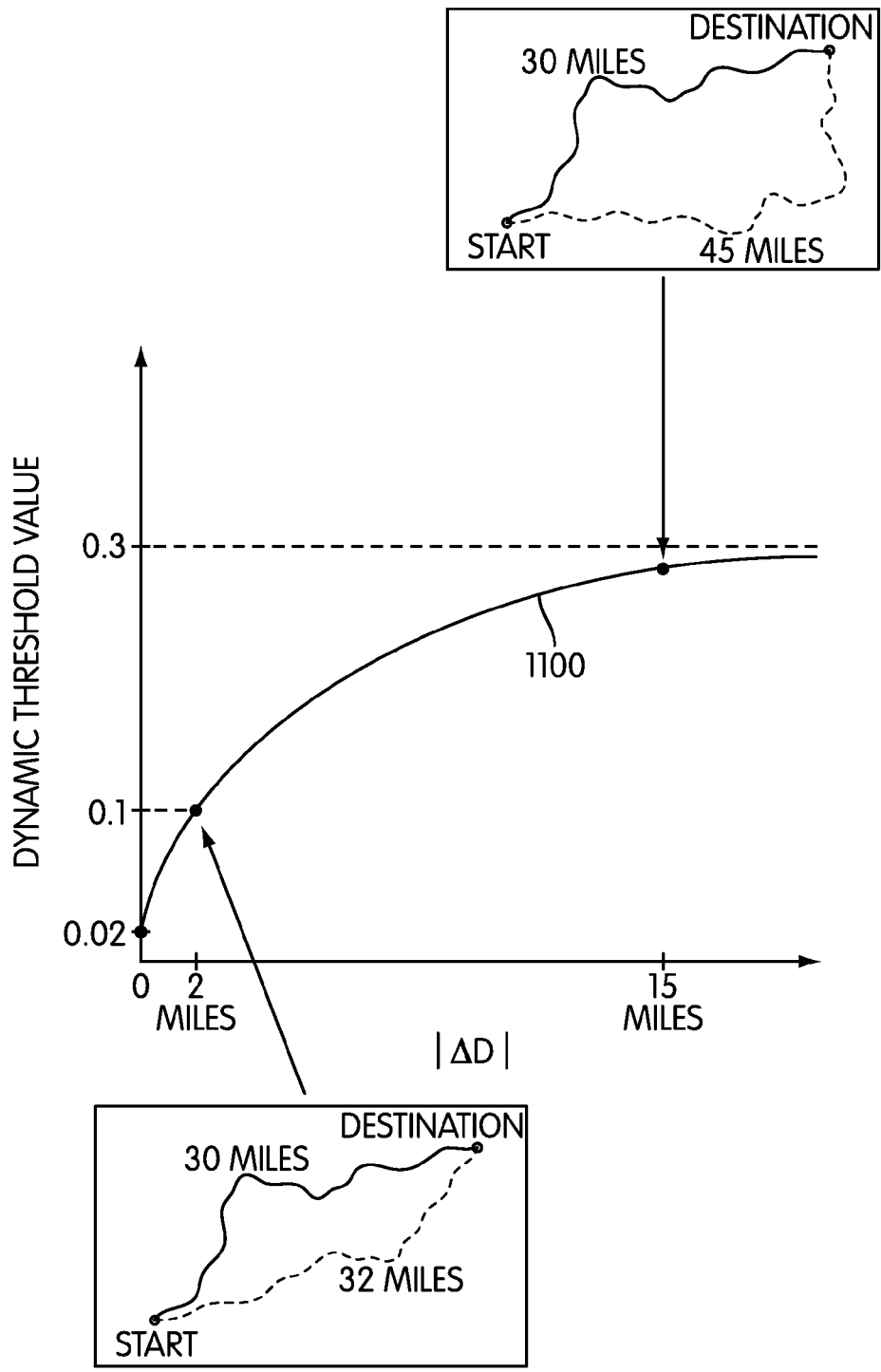
FIG. 11 is an embodiment of a relationship between a dynamic threshold value and a difference in distance between two routes.

FIG. 11 illustrates an embodiment of a relationship between the difference in distances between the current route and the alternative route (delta D) and dynamic threshold value 1100. Specifically, in the current embodiment, only the absolute value of the difference in distances between the current route and the alternative route is used to determine the dynamic threshold value. In this exemplary embodiment, as the difference in the distances along the current route and the alternative route increases, the dynamic threshold value also increases. For example, in this case, when the difference in the distances along the current route and the alternative route has a value of 2 miles, the dynamic threshold value is approximately 0.1. In contrast, when the difference in distances along the current route and the alternative route has a value of 15 miles, the dynamic threshold value is approximately 0.3.

Because the minimum time difference is proportional to the dynamic threshold value, this means that the minimum time difference will also increase as the difference in the distances along the current route and the alternative route increases. Therefore, as the difference in the distances along the current route and the alternative route increases, the likelihood of the navigation system displaying the alternative route decreases. Likewise, as the difference in distances along the current route and the alternative route decreases, the likelihood of the navigation system displaying the alternative route increases. In other words, the navigation system discussed in this detailed description is designed to increase the probability that an alternative route will be displayed when the distances along the current route and the alternative route are sufficiently close. This is useful since a user may feel more comfortable trying an alternative route if the distances on each route are substantially similar.

FIG. 11 is only intended to show one possible relationship between a dynamic threshold value and the difference in distances along two routes. In other embodiments, any other relationships could be used, including any other functions. Examples of possible functions include any linear and non-linear functions. In another embodiment, for example, the dynamic threshold value could be calculated according to an asymptotic function that asymptotically approaches a maximum threshold value and that also asymptotically approaches a minimum threshold value. For example, in one embodiment, a relationship for the dynamic threshold value could incorporate the arctangent function, which displays the desired asymptotic behavior. Furthermore, in some cases, the value of the dynamic threshold value may decrease in situations where the distance along the alternative route is less than the distance along the current route, since a shorter distance for the alternative route further decreases the risks associated with switching routes. In other words, in some cases, the dynamic threshold value could asymptotically approach a minimum value as the value of the distance along the alternative route minus the distance along the current route decreases further below zero.

In the current embodiment shown in FIG. 11, the dynamic threshold value has minimum and maximum threshold values equal to 0.02 and 0.3, respectively. However, in other embodiments, the minimum and maximum threshold values could have any other values. In some cases, the minimum value could be in the range between 0.01 and 0.05 (or 1%-5%). Also, in some cases, the maximum threshold value could be in the range between 0.2 and 0.3 (or 20%-30%). In still other cases, however, the minimum threshold value could be any value between 0 and 1. Also, in other cases, the maximum threshold value could be any value between 0 and 1 that is also greater than the minimum threshold value. The maximum and minimum threshold values may be determined by a manufacturer in some cases.

Figure 12:
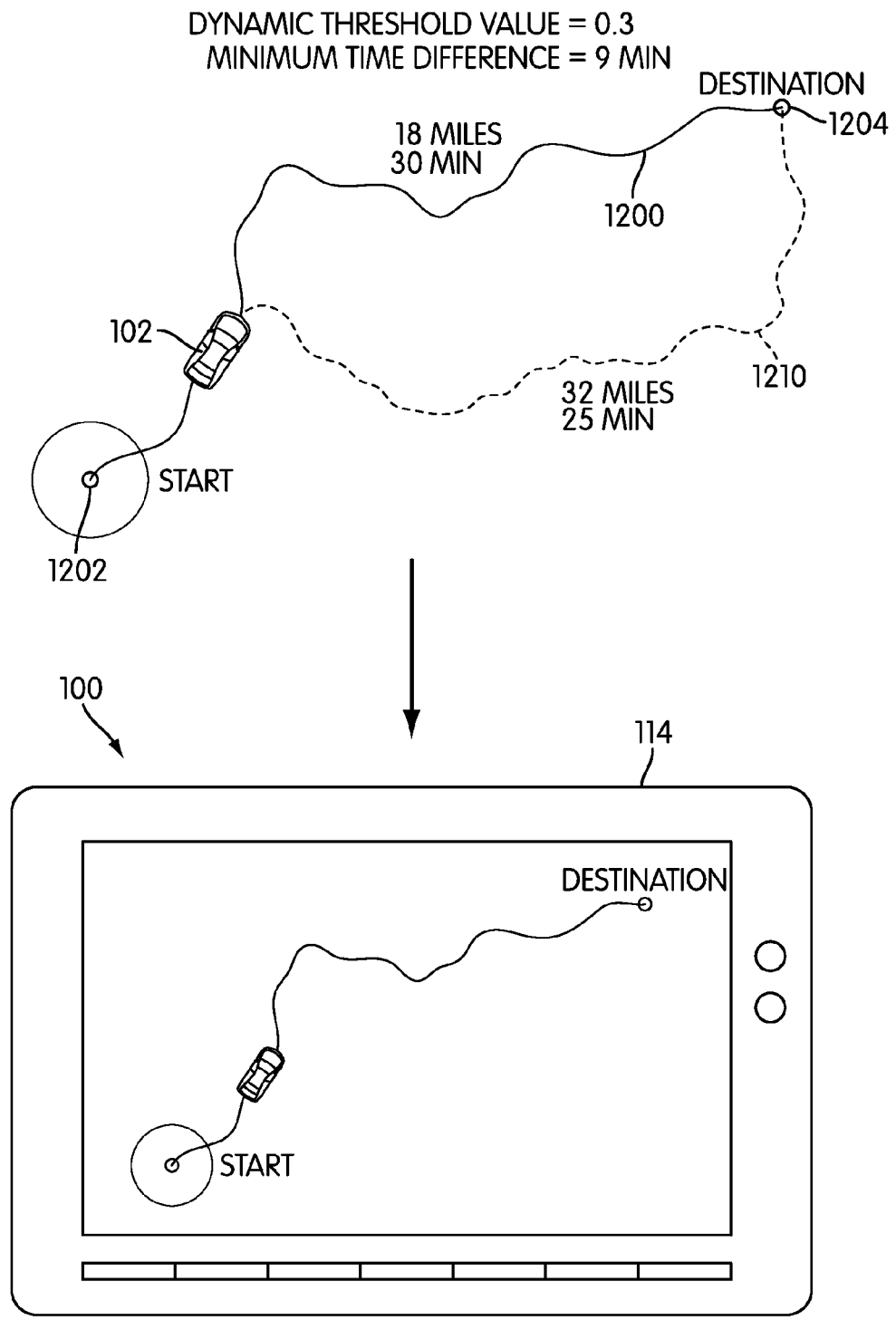
FIG. 12 is a schematic view of the operation of an embodiment of a navigation system.
Figure 13:
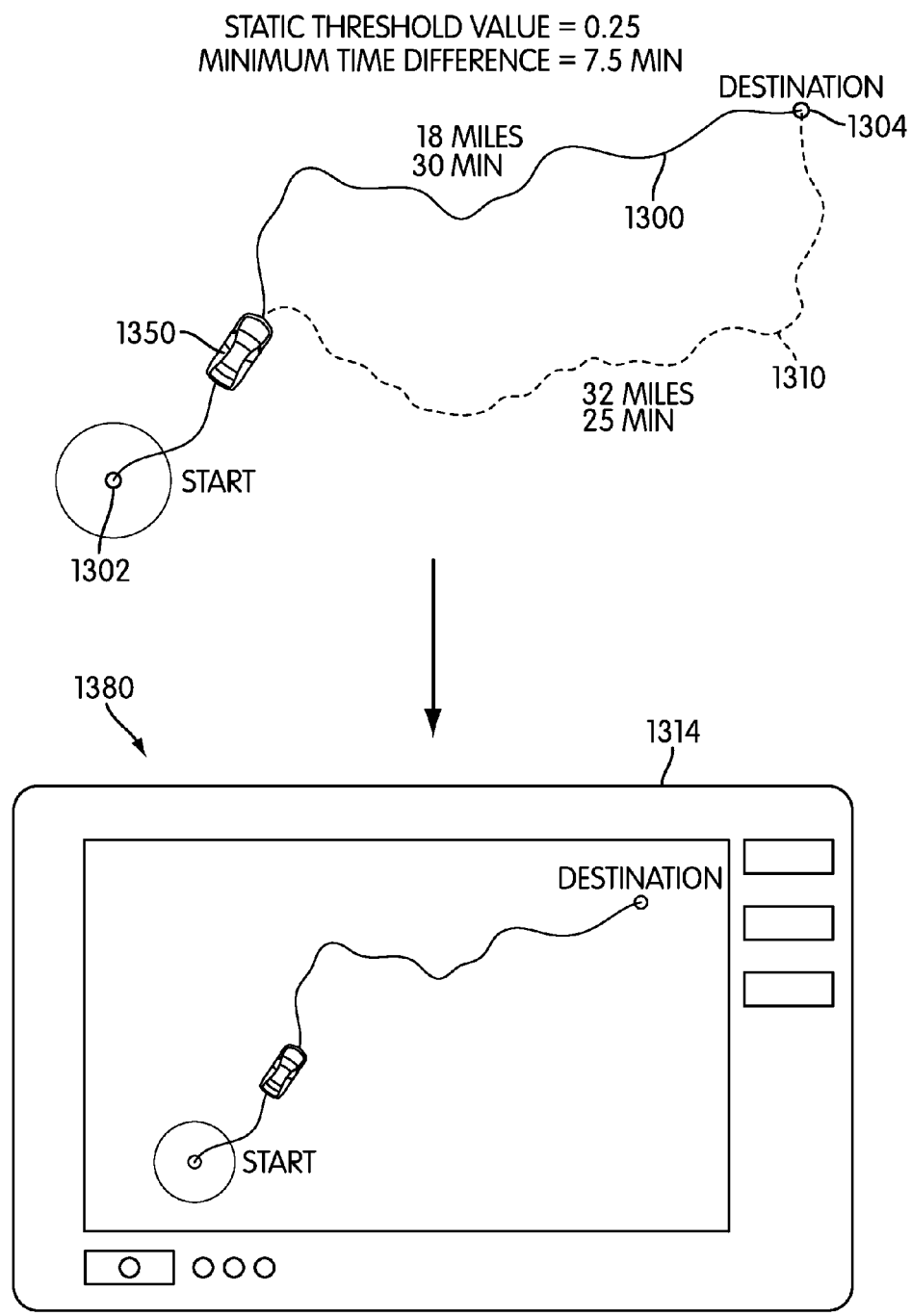
FIG. 13 is a schematic view of the operation of an alternative embodiment of a navigation system.
Figure 14:
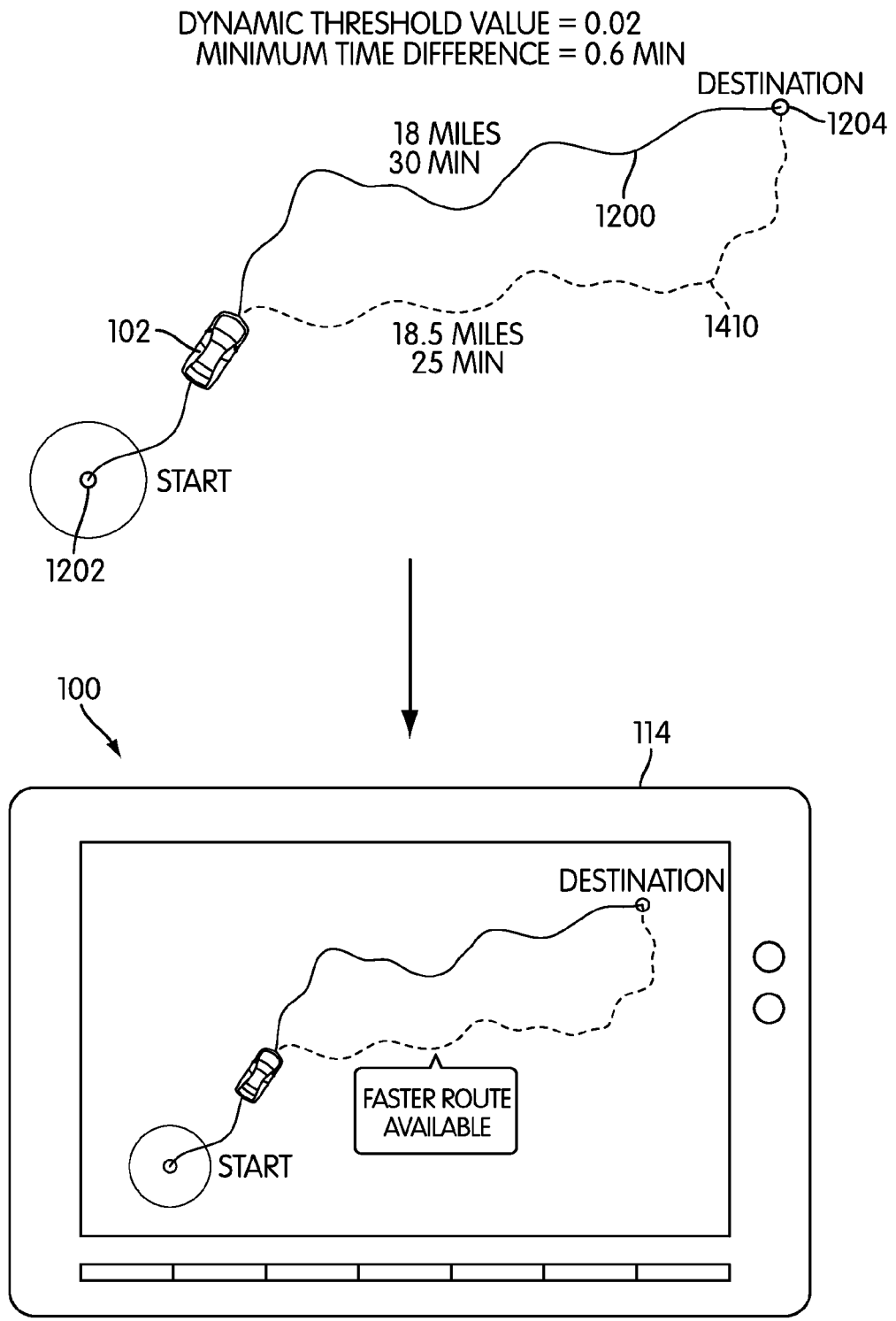
FIG. 14 is a schematic view of the operation of an embodiment of a navigation system.
Figure 15:
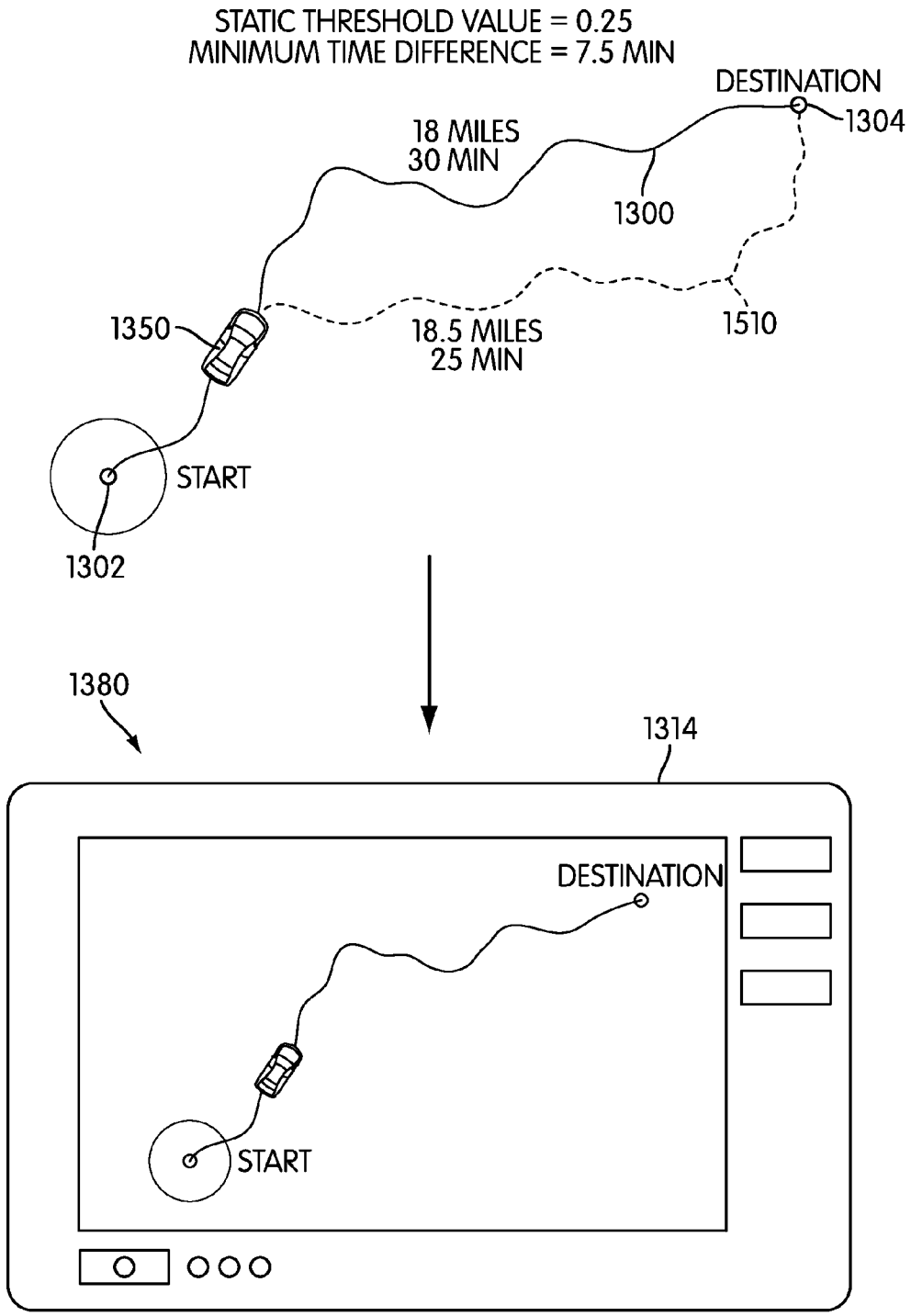
FIG. 15 is a schematic view of the operation of an alternative embodiment of a navigation system.

FIGS. 12 through 15 are intended to contrast the operation of embodiments of the proposed navigation system with an alternative embodiment of a navigation system. In particular, FIGS. 12 and 14 illustrate the operation of an embodiment of navigation system 100, while FIGS. 13 and 15 illustrate the operation of an alternative navigation system.

Referring to FIG. 12, motor vehicle 102 is traveling on current route 1200 between starting point 1202 destination 1204. In addition, navigation system 100 has found alternative route 1210. In this case, the travel time on current route 1200 is estimated to be 30 minutes and the travel time on alternative route 1210 is estimated to be 25 minutes. In addition, the distance left to travel on current route 1200 is 18 miles, while the distance left to travel on alternative route 1210 is 32 miles. In this exemplary embodiment, the dynamic threshold value has been calculated as 0.3 using a relationship approximately similar to the relationship shown in FIG. 11. The minimum time difference, which in this exemplary embodiment equals the dynamic threshold value times the travel time on the current route, is 9 minutes. Furthermore, because the difference in travel times on the two routes is 5 minutes, which is less than the minimum time difference, alternative route 1210 is not displayed on interface 114 for the user.

As seen in FIG. 13, motor vehicle 1350 utilizes navigation system 1380, which is substantially different from the type of navigation system disclosed in this detailed description. Motor vehicle 1350 may travel on current route 1300 between starting point 1302 and destination 1304. Furthermore, navigation system 1380 has found alternative route 1310. In this case, current route 1300 and alternative route 1310 may be substantially similar to current route 1200 and alternative route 1210 shown in FIG. 12. In particular, the travel time on current route 1300 is estimated to be 30 minutes and the travel time on alternative route 1310 is estimated to be 25 minutes. In addition, the distance left to travel on current route 1300 is 18 miles, while the distance left to travel on alternative route 1310 is 32 miles. In contrast to the previous embodiment, however, navigation system 1380 uses a static threshold value. In particular, the static threshold value has a constant value. In this embodiment, the static threshold value has a value of 0.25 and the minimum time difference, which is equal to the static threshold value times the travel time on the current route, is equal to 7.5 minutes. Since the difference in travel times between the two routes is less than the minimum time difference, navigation system 1380 may not display alternative route 1310 on interface 1314.

Referring now to FIG. 14, in another instance of operation of navigation system 100, motor vehicle 102 may again be traveling on current route 1200. In this case, however, navigation system 100 may find alternative route 1410 that is substantially different from alternative route 1210 that was discussed above. In particular, alternative route 1410 is approximately 18.5 miles long. Also, the travel time on alternative route 1410 is 25 minutes. Therefore, the difference in travel times between the two routes is 5 minutes. Because the difference in the distances along the two routes is 0.5 miles, which is substantially less than the difference in the distances along the two routes shown in FIG. 12, the dynamic threshold value has decreased to 0.02 according to the exemplary relationship shown in FIG. 11. Moreover, the minimum time difference has a value of 0.6 minutes. In this situation, the difference in the travel times on the two routes is greater than the minimum time difference. Therefore, as shown in FIG. 14, alternative route 1410 is displayed for the user on interface 114. This allows the user the ability to select the alternative route without any significant risk that switching routes will actually increase the total travel time.

Referring now to FIG. 15, which illustrates another instance of an embodiment of navigation system 1380, motor vehicle 1350 is traveling on current route 1300. Navigation system 1380 has found alternative route 1510, which may be substantially similar to route 1410 as seen in FIG. 14. However, in this embodiment, the static threshold value is equal to the constant value of 0.25, as discussed and shown in FIG. 13. Because the time of travel on current route 1300 has the same value of 30 minutes in this situation, the minimum time difference in this case is equal to 7.5 minutes. Moreover, the difference in travel times between the two routes is still less than the minimum time difference. Therefore, in this situation, navigation system 1380 may not display alternative route 1510 for the user even though the distance along alternative route 1510 is very close to the distance along current route 1300.

Using the configuration for navigation system 100 discussed throughout this detailed description, a method of determining if an alternative route should be displayed to a user may be improved. Specifically, the criteria for determining if an alternative route should be displayed changes as the difference in the distances along the current route and the alternative route varies. This increases the probability of the navigation system selecting an alternative route in situations where the distances between the two routes are close or approximately equal, and decreases the probability of the navigation system selecting an alternative route in situations where the distances between the two routes are relatively large.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of providing navigation information for a motor vehicle including a navigation system having an electronic control unit, comprising the steps of:
retrieving, by the electronic control unit in the navigation system, a current route that is being used to navigate the motor vehicle to a destination;
receiving, by the electronic control unit in the navigation system, a current location for the motor vehicle;
calculating, by the electronic control unit in the navigation system, an alternative route from the current location to the destination, wherein a first travel time between the current location and the destination along the alternative route is estimated to be less than a second travel time between the current location and the destination along the current route;
determining, by the electronic control unit in the navigation system, a first distance corresponding to the alternative route and a second distance corresponding to the distance left to travel on the current route;
calculating, by the electronic control unit in the navigation system, a dynamic threshold value that changes as a function of one or more inputs that change as the motor vehicle travels towards the destination;
wherein all the foregoing steps are executed by the electronic control unit in the navigation system as the motor vehicle is travelling along the current route towards the destination; and
using, by the electronic control unit in the navigation system, the dynamic threshold value, the first distance, the second distance, the first travel time and the second travel time to determine if the alternative route should be displayed for the user.

2. The method according to claim 1, wherein the current location is a GPS location.

3. The method according to claim 1, wherein the dynamic threshold value varies as a function of the distance along the current route and the distance along the alternative route.

4. The method according to claim 3, wherein the dynamic threshold value is calculated using a difference between the first distance and the second distance.

5. The method according to claim 4, wherein the dynamic threshold value increases as the value of the first distance minus the second distance increases.

6. The method according to claim 3, wherein the dynamic threshold value is used to calculate a minimum time difference and wherein the navigation system compares the difference between the second travel time and the first travel time to the minimum time difference.

7. A method of providing navigation information for a motor vehicle including a navigation system having an electronic control unit, comprising the steps of:
retrieving, by the electronic control unit in the navigation system, a current route that is being used to navigate the motor vehicle to a destination;
receiving, by the electronic control unit in the navigation system, a current location for the motor vehicle;
calculating, by the electronic control unit in the navigation system, an alternative route from the current location to the destination, wherein a first travel time between the current location and the destination along the alternative route is estimated to be less than a second travel time between the current location and the destination along the current route;
determining, by the electronic control unit in the navigation system, a first distance corresponding to the alternative route and a second distance corresponding to the distance left to travel on the current route;
calculating, by the electronic control unit in the navigation system, a minimum time difference;
submitting, by the electronic control unit in the navigation system, the alternative route to be displayed for a user when the value of the second travel time minus the first travel time is greater than the minimum time difference;

calculating, by the electronic control unit in the navigation system, a dynamic threshold value that changes as a function of one or more inputs that change as the motor vehicle travels towards the destination;

wherein the minimum time difference is calculated from at least the first distance, the second distance and the dynamic threshold value;

wherein all the foregoing steps are executed by the electronic control unit in the navigation system as the motor vehicle is travelling along the current route towards the destination;

preventing, by the electronic control unit in the navigation system, the alternative route from being displayed for the user when the value of the second travel time minus the first travel time is less than or equal to the minimum time difference.

8. The method according to claim 7, wherein the minimum time difference increases as the difference between the first distance and the second distance increases.

9. The method according to claim 7, wherein the minimum time difference increases as the value of the first distance minus the second distance increases.

10. The method according to claim 7, wherein the minimum time difference is equal to the dynamic threshold value multiplied by the second travel time.

11. The method according to claim 10, wherein the dynamic threshold value is calculated as a function of the difference between the first distance and the second distance.

12. The method according to claim 11, wherein the dynamic threshold value increases as the value of the first distance minus the second distance increases.

13. The method according to claim 12, wherein the dynamic threshold value approaches a maximum value asymptotically as a function of the difference between the first distance and the second distance.

14. A method of providing navigation information for a motor vehicle including a navigation system having an electronic control unit, comprising the steps of:

retrieving, by the electronic control unit in the navigation system, a current route that is being used to navigate the motor vehicle to a destination;

receiving, by the electronic control unit in the navigation system, a current location for the motor vehicle;

calculating, by the electronic control unit in the navigation system, an alternative route from the current location to the destination, wherein a first travel time between the current location and the destination along the alternative route is estimated to be less than a second travel time between the current location and the destination along the current route;

determining, by the electronic control unit in the navigation system, a first distance corresponding to the alternative route and a second distance corresponding to the distance left to travel on the current route;

calculating, by the electronic control unit in the navigation system, a dynamic threshold value that changes as a function of one or more inputs that change as the motor vehicle travels towards the destination, wherein the dynamic threshold value approaches a maximum value asymptotically as a function of the difference between the first distance and the second distance;

setting, by the electronic control unit in the navigation system, a minimum time difference equal to the dynamic threshold value multiplied by the second travel time;

wherein all the foregoing steps are executed by the electronic control unit in the navigation system as the motor vehicle is travelling along the current route towards the destination; and comparing, by the electronic control unit in the navigation system, the value of the second travel time minus the first travel time with the minimum time difference to determine if the alternative route should be displayed for a user.

15. The method according to claim 14, wherein the calculation of the dynamic threshold value incorporates an arctangent function;

and wherein the method further includes a step of:

submitting, by the electronic control unit in the navigation system, the alternative route to be displayed for a user when the value of the second travel time minus the first travel time is greater than the minimum time difference.

16. The method according to claim 15, wherein the method further includes the step of:

preventing, by the electronic control unit in the navigation system, the alternative route from being displayed for the user when the value of the second travel time minus the first travel time is less than or equal to the minimum time difference.

17. The method according to claim 14, wherein the dynamic threshold value increases as the value of the first distance minus the second distance increases.

18. The method according to claim 14, wherein the dynamic threshold value decreases as the value of the first distance minus the second distance decreases.

19. The method according to claim 14, wherein the dynamic threshold value increases as the absolute value of the first distance minus the second distance increases.

20. The method according to claim 14, wherein a probability that the alternative route is displayed decreases as the value of the first distance minus the second distance increases.

* * * * *